United States Patent
Gibbons et al.

(10) Patent No.: US 10,755,822 B2
(45) Date of Patent: Aug. 25, 2020

(54) IN-VESSEL ROD HANDLING SYSTEMS

(71) Applicant: TerraPower, LLC, Bellevue, WA (US)

(72) Inventors: Peter W. Gibbons, Kennewick, WA (US); Stephen W. Hiller, Kennewick, WA (US); Calen Kaneko, Seattle, WA (US); Owen Dean Nelson, Richland, WA (US); Ashok Odedra, Bellevue, WA (US); P. Harley Park, Bellevue, WA (US)

(73) Assignee: TerraPower, LLC, Bellevue, WA (US)

( * ) Notice: Subject to any disclaimer, the term of this patent is extended or adjusted under 35 U.S.C. 154(b) by 361 days.

(21) Appl. No.: 15/612,743

(22) Filed: Jun. 2, 2017

(65) Prior Publication Data

US 2018/0061511 A1 Mar. 1, 2018

Related U.S. Application Data

(60) Provisional application No. 62/382,650, filed on Sep. 1, 2016.

(51) Int. Cl.
| | | |
|---|---|---|
| G21C 19/00 | (2006.01) | |
| G21C 7/10 | (2006.01) | |
| G21C 19/20 | (2006.01) | |
| G21C 19/06 | (2006.01) | |
| G21C 19/07 | (2006.01) | |
| G21C 1/02 | (2006.01) | |
| G21C 7/32 | (2006.01) | |
| G21C 17/04 | (2006.01) | |
| G21C 19/50 | (2006.01) | |
| G21C 7/08 | (2006.01) | |
| G21C 7/34 | (2006.01) | |

(52) U.S. Cl.
CPC .............. *G21C 7/10* (2013.01); *G21C 1/026* (2013.01); *G21C 7/32* (2013.01); *G21C 17/042* (2013.01); *G21C 19/065* (2013.01); *G21C 19/07* (2013.01); *G21C 19/205* (2013.01); *G21C 19/50* (2013.01); *G21C 7/08* (2013.01); *G21C 7/34* (2013.01); *Y02E 30/34* (2013.01)

(58) Field of Classification Search
CPC ........ G21C 19/00; G21C 19/02; G21C 19/10; G21C 19/18; G21C 19/20; G21C 19/205
See application file for complete search history.

(56) References Cited

U.S. PATENT DOCUMENTS

2013/0177124 A1 * 7/2013 Chassignet ............ G21C 19/10
376/261

OTHER PUBLICATIONS

Hahn et al., "Conceptual Design of the Sodium-Cooled Fast Reactor Kalimer-600" Nuclear Engineering and Technology 39(3) (Jun. 2007).

(Continued)

*Primary Examiner* — Marshall P O'Connor (57) ABSTRACT

A rod transfer assembly has an outer rotating plug. A pick-up arm assembly extends from the outer rotating plug and includes a pivoting arm. An inner rotating plug is disposed off-center from and within the outer rotating plug and is rotatable independent of a rotation of the outer rotating plug. An access port rotating plug is disposed off-center from and within the inner rotating plug and is rotatable independent of rotation of the outer and inner rotating plugs. A pull arm extends from the access port rotating plug.

20 Claims, 10 Drawing Sheets

(56) References Cited

OTHER PUBLICATIONS

Yoo et al., "Overall System Description and Safety Characteristics of Prototype Gen IV Sodium Cooled Fast Reactor in Korea" Nuclear Engineering and Technology (Aug. 2016) http://dx.doi.org/10.1016/j.net.2016.08.004.

Forsberg et al., Refueling Options and Considerations for Liquid-Salt-Cooled Very High-Temperature Reactors, ORNL/TM-2006/92, Jun. 2006.

* cited by examiner

FIG.1

PRIOR ART

IN-VESSEL ROD HANDLING SYSTEMS

CROSS-REFERENCE TO RELATED APPLICATIONS

This application claims the benefit of U.S. Provisional Patent Application No. 62/382,650, filed Sep. 1, 2016, entitled "IN-VESSEL ROD HANDLING SYSTEM", the disclosure of which is hereby incorporated by reference in its entirety herein.

INTRODUCTION

Nuclear fission reactors include breed-and-burn fast reactors (also referred to as traveling wave reactors, or TWRs). TWR means a reactor that would be designed to operate indefinitely using natural uranium, depleted uranium, spent light water reactor fuel, or thorium as a reload fuel after start up, and in which waves that breed and then burn would travel relative to the fuel. Thus, in some aspects, the TWR is a once-through fast reactor that runs on subcritical reload fuel which is bred up to a useful state and burned in situ. In a TWR, a wave of breeding and fissioning (a "breed-burn wave") is originated in a central core of the reactor and moves relative to the fuel. In cases where the fuel is stationary, the breed and burn wave expands outward from the ignition point. In some cases, the fuel may be moved so that the breed and burn wave stays stationary relative to the core (e.g., a standing wave) but moves relative to the fuel; a standing wave is to be considered a type of TWR. Movement of fuel assemblies is referred to as "fuel shuffling" and can accomplish the standing wave, adjustment to reactor characteristics (heat, flux, power, fuel burn up, etc.). The central core in which the fuel assemblies are shuffled is disposed in a reactor vessel. The fuel assemblies include fissile nuclear fuel assemblies and fertile nuclear fuel assemblies. Reactivity control assemblies may also be disposed in the central core for adjustment of reactor characteristics.

Fission energy defined by the standing wave creates thermal energy which is transferred in series through one or more primary coolant loops and intermediate coolant loops to steam generators to produce electricity, and low temperature heat is rejected through a set of water-cooled vacuum condensers. The separation of coolant systems into both primary and intermediate coolant loops helps maintain the integrity of the core and the primary coolant loops. In the TWR, both the primary and intermediate coolant loops utilize liquid sodium as the coolant.

SUMMARY

In one aspect, the technology relates to a rod transfer assembly, having: an outer rotating plug having an outer rotating plug axis; a pick-up arm assembly extending from the outer rotating plug and having a shaft having a shaft axis parallel to the outer rotating plug axis and a pivoting arm pivotable about the shaft axis, wherein the shaft axis is positioned a first radial distance from the outer rotating plug axis; an inner rotating plug disposed off-center from and within the outer rotating plug, the inner rotating plug includes an inner rotating plug axis, wherein the inner rotating plug is rotatable independent of a rotation of the outer rotating plug; an access port rotating plug disposed off-center from and within the inner rotating plug, wherein the access port rotating plug is rotatable independent of a rotation of the outer rotating plug and the inner rotating plug; and a pull arm extending from the access port rotating plug and includes a pull arm axis. In an embodiment, each of the outer rotating plug axis, the shaft axis, the inner rotating plug axis, and the pull arm axis are parallel to each other. In another embodiment, rotation of the access port rotating plug and rotation of the inner rotating plug aligns the pull arm axis with the outer rotating plug axis. In yet another embodiment, the outer rotating plug, the inner rotating plug, and the access port rotating plug are positionable so as to position the pull arm at a first distance from an outer circumference of the large rotating plug. In still another embodiment, the pivoting arm includes a pick-up mechanism having a pick-up axis disposed proximate an end opposite the shaft of the pivoting arm.

In another embodiment of the above aspect, upon pivoting of the pivoting arm, the pick-up axis is positionable between the shaft axis and the outer rotating plug axis; wherein when so positioned, the pick-up axis is disposed a second distance from an outer circumference of the outer rotating plug; and wherein the second distance is at least one of greater than or equal to the first distance. In an embodiment, each of the outer rotating plug, the inner rotating plug, the access port rotating plug, and the pivoting arm have a range of rotation at least 90 degrees. In another embodiment, the range of rotation is at least 180 degrees. In yet another embodiment, the range of rotation is substantially equal to 360 degrees. In still another embodiment, the pull arm extends above and below an upper surface of the inner rotating plug.

In another embodiment of the above aspect, a radius of pivoting for the pivoting arm is less than a reference diameter of the inner rotating plug. In an embodiment, the radius of pivoting for the pivoting arm includes an entirety of an in-vessel storage and a portion of a reactor core center. In another embodiment, a radius of pivoting for the pull arm includes an entirety of a reactor core center. In yet another embodiment, the radius of pivoting for the pull arm includes an inner ring of an in-vessel storage. In still another embodiment, the radius of pivoting for the pull arm includes an outer ring of an in-vessel storage.

BRIEF DESCRIPTION OF THE DRAWINGS

The following drawing figures, which form a part of this application, are illustrative of described technology and are not meant to limit the scope of the technology as claimed in any manner, which scope shall be based on the claims appended hereto.

DETAILED DESCRIPTION

Figure 1:
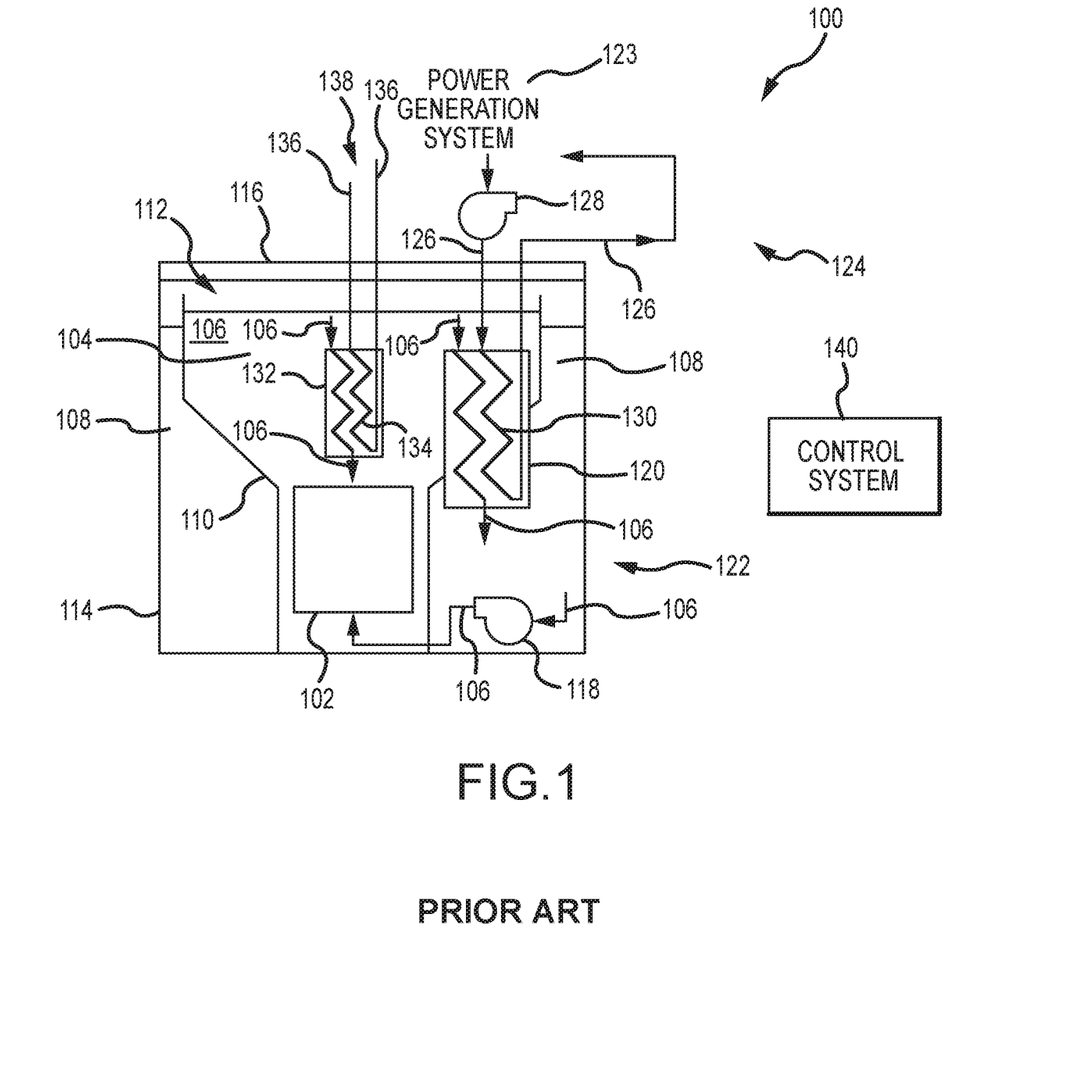
FIG. 1 illustrates, in a block diagram form, some of the basic components of a molten fuel reactor.

FIG. 1 illustrates, in a block diagram form, some of the basic components of a travelling wave reactor (TWR) 100. In general, the TWR 100 includes a reactor core 102 containing a plurality of fuel assemblies (not shown). The core 102 is disposed at the lowest position within a pool 104 holding a volume of liquid sodium coolant 106. The pool 104 is referred to as a hot pool and has a sodium temperature higher than that of a surrounding cold pool 108 (due to the energy generated by the fuel assemblies in the reactor core 102), which also contains liquid sodium coolant 106. The hot pool 104 is separated from the cold pool 108 by an inner vessel 110. A headspace 112 above the level of the sodium coolant 106 may be filled with an inert cover gas, such as argon. A containment vessel 114 surrounds the reactor core 102, hot pool 104, and cold pool 108, and is sealed with a reactor head 116. The reactor head 116 provides various access points into the interior of the containment vessel 114.

The size of the reactor core 102 is selected based on a number of factors, including the characteristics of the fuel, desired power generation, available reactor 100 space, and so on. Various embodiments of a TWR may be used in low power (around 300 $MW_e$—around 500 $MW_e$), medium power (around 500 $MW_e$—around 1000 $MW_e$), and large power (around 1000 $MW_e$ and above) applications, as required or desired. The performance of the reactor 100 may be improved by providing one or more reflectors, not shown, around the core 102 to reflect neutrons back into the core 102. Additionally, fertile and fissile nuclear assemblies are moved (or "shuffled") within and about the core 102 to control the nuclear reaction occurring therein. Components for moving these nuclear assemblies within the core are the subject of this application and are described in more detail below in FIGS. 2-3H.

The sodium coolant 106 is circulated within the vessel 114 via a primary sodium coolant pump 118. The primary coolant pump 118 draws sodium coolant 106 from the cold pool 108 and injects it into the hot pool 104, proximate (e.g., below) the reactor core 102, where the coolant 106 is heated due to the reactions taking place within the reactor core 102. A portion of the heated coolant 106 enters an intermediate heat exchanger 120 from an upper portion of the hot pool 104, and exits the intermediate heat exchanger 120 at a location in the cold pool 108. This primary coolant loop 122 thus circulates sodium coolant 106 entirely within the reactor vessel 114.

The intermediate heat exchanger 120 also includes liquid sodium coolant and acts as a barrier between the primary coolant loop 122 and a power generation system 123, so the integrity of the core 102 and primary coolant loop 122 can be ensured. The intermediate heat exchanger 120 transfers heat from the primary coolant loop 122 (fully contained within the vessel 114) to an intermediate coolant loop 124 (that is only partially located within the vessel 114). The intermediate heat exchanger 120 passes through an opening in the inner vessel 110, thus bridging the hot pool 104 and the cold pool 108 (so as to allow flow of sodium 106 in the primary coolant loop 122 therebetween). In an embodiment, four intermediate heat exchangers 120 are distributed within the vessel 114.

The intermediate coolant loop 124 circulates sodium coolant 126 that passes through pipes into and out of the vessel 114, via the reactor head 116. An intermediate sodium pump 128 located outside of the reactor vessel 114 circulates the sodium coolant 126. Heat is transferred from the sodium coolant 106 of the primary coolant loop 122 to the sodium coolant 126 of the intermediate coolant loop 124 in the intermediate heat exchanger 120. The sodium coolant 126 of the intermediate coolant loop 124 passes through a plurality of tubes 130 within the intermediate heat exchanger 120. These tubes 130 keep separate the sodium coolant 106 of the primary coolant loop 122 from the sodium coolant 126 of the intermediate coolant loop 124, while transferring heat energy therebetween.

A direct heat exchanger 132 extends into the hot pool 104 and provides additional cooling to the sodium coolant 106 within the primary coolant loop 122. The direct heat exchanger 132 is configured to allow sodium coolant 106 to enter and exit the heat exchanger 132 from the hot pool 104. The direct heat exchanger 132 has a similar construction to the intermediate heat exchanger 120, where tubes 134 keep separate the sodium coolant 106 of the primary coolant loop 122 from a sodium coolant 136 of a direct reactor coolant loop 138, while transferring heat energy therebetween.

Other ancillary reactor components (both within and outside of the reactor vessel 114) include, but are not limited to, pumps, check valves, shutoff valves, flanges, drain tanks, etc., that are not depicted but would be apparent to a person of skill in the art. Additional penetrations through the reactor head 116 (e.g., a port for the primary coolant pump 118, inert cover gas and inspection ports, sodium processing ports, etc.) are not depicted. A control system 140 is utilized to control and monitor the various components of the reactor 100.

Broadly speaking, this disclosure describes configurations that improve the performance of the reactor 100 described in FIG. 1. Specifically, embodiments, configurations, and arrangements of an in-vessel rod transfer assembly are shown and described in more detail below with reference to FIGS. 2-3H.

In general, the in-vessel rod handling assembly allows for movement of fuel assemblies within and proximate the core without having to open the vessel, thus enabling more efficient operation of the reactor. For example, the in-vessel rod handling assembly manages the locations of the various fuel assemblies within the vessel, namely, by moving fuel assemblies between and within the core and the storage areas of the vessel. Such movement or "shuffling" of fuel assemblies is required so as to control the nuclear reaction occurring in the vessel. The in-vessel rod handling assembly also facilities movement of fuel assemblies into an out of the reactor vessel (via one or more penetrations in the reactor head). Such movement into and out of the reactor vessel is required as new fuel is introduced to the vessel and spent fuel is removed from the vessel.

The shuffling of the fissile and fertile nuclear fuel assemblies occurs entirely within the vessel and beneath the reactor head. This configuration thereby limits the need to open the reactor, which maintains the shielding of the vessel for any heated and/or radioactive materials therein. The in-vessel rod handling assembly moves fuel assemblies to and from in-vessel storage sites or tubes at the periphery of the core to various locations within the core. Additionally, the in-vessel rod handling assembly moves fuel assemblies between various locations within the core area. Moreover, fuel assemblies introduced to the vessel are moved from a transfer pot to the periphery of the core or the core itself. Reverse operation into the transfer pot allows fuel assemblies to be removed from the vessel. All of these operations and movements occur without having to open up the vessel, thereby increasing reactor efficiency.

Figure 2:
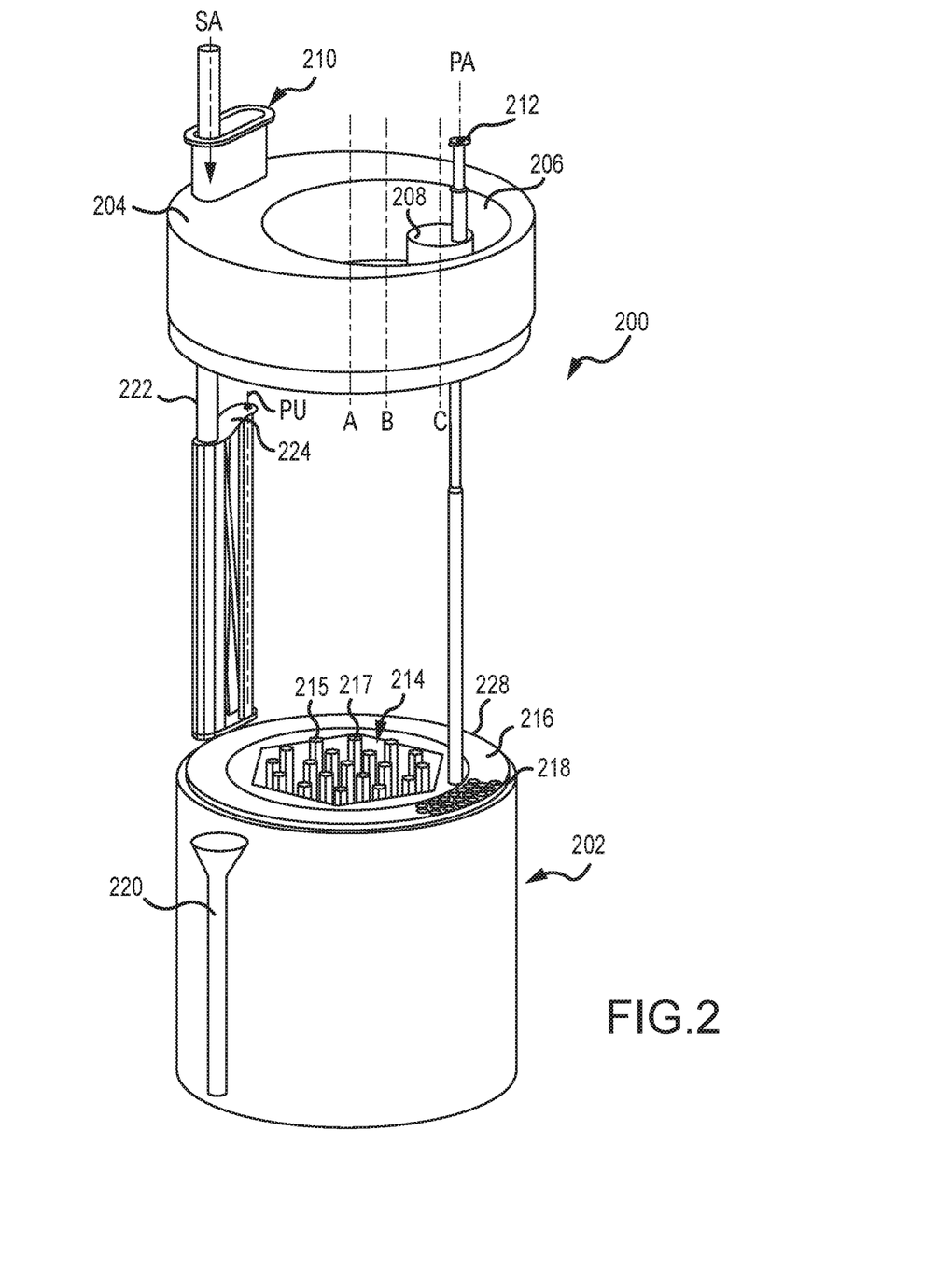
FIG. 2 is a perspective view of an example in-vessel rod handling system.

FIG. 2 is a perspective view of an example embodiment of an in-vessel handling system 200 and core assembly 202. The in-vessel handling system 200 includes an outer rotating plug 204 with a pick-up arm assembly 210 secured thereto, an inner rotating plug 206 (shown removed from FIG. 2), and an access port rotating plug 208 with a pull arm 212 secured thereto. The core assembly 202 is schematically shown and includes a central core region 214 having a plurality of fissile nuclear fuel assemblies 215 and fertile nuclear fuel assemblies 217, a peripheral core region 216 including in-vessel storage pots 218, and fuel transfer port 220. In FIG. 2 and the following figures, only a portion of the fissile nuclear fuel assemblies 215, fertile nuclear fuel assemblies 217, and in-vessel storage pots 218 are depicted for illustrative purposes. In the embodiment shown, the outer rotating plug 204, inner rotating plug 206, and access port rotating plug 208 are all vertically spaced apart from the top 228 of the central core region 214. Many components are omitted for clarity and other embodiments can include more or fewer components in the in-vessel handling system 200 and/or core assembly 202.

The outer rotating plug 204 rotates about central axis A with a typical rotation range of +/−180 degrees. In other examples, the range of rotation may extend to +/−360 degrees. Typically, the reactor head 116 depicted in FIG. 1 surrounds the outer rotating plug 204.

The pick-up arm assembly 210 is secured to the outer rotating plug 204 at a position radially off-center from the central axis A and rotates with the outer rotating plug 204. The pick-up arm assembly 210 includes a shaft 222 with shaft axis SA, where the shaft axis SA is parallel to the central axis A of the outer rotating plug 204. The pick-up arm assembly 210 extends through the outer rotating plug 204 to the top of the reactor core 228. The pick-up arm assembly 210 also includes a pivoting arm 224 having a pick-up axis PU. The pivoting arm 224 pivots about the shaft axis SA independent of the rotation of the outer rotating plug 204. In examples, the pivoting arm 224 has a typical rotation range of +/−180 degrees, but in other instances, pivoting arm 224 may be rotated continuously in either direction.

The inner rotating plug 206 is positioned within the outer rotating plug 204. The inner rotating plug 206 has a central axis B that is radially offset from the central axis A of the outer rotating plug 204. Additionally, the inner rotating plug 206 is rotatable independent of the outer rotating plug 204. The inner rotating plug 206 has a typical rotation range of +/−90 degrees, but in other examples, the rotation range may extend to +/−360 degrees.

The access port rotating plug 208 is positioned within the inner rotating plug 206. The access port rotating plug 208 has a central axis C that is offset, radially, from both the outer rotating plug 204 central axis A and the inner rotating plug 206 central axis B. The access port rotating plug 208 has a typical rotation range of +/−90 degrees, but in other examples, the rotation range may extend to +/−360 degrees.

The pull arm 212 is supported by the access port rotating plug 208 and is rotated by the access port rotating plug 208. The pull arm has an axis PA that is offset from each of: the outer rotating plug 204 central axis A, the inner rotating plug 206 central axis B, and the access port rotating plug 208 central axis C. The pull arm 212 extends through the access port rotating plug 208 down to the top of the reactor core 228.

Generally, the in-vessel handling system 200 is configured to shuffle the fissile nuclear fuel assemblies 215 and fertile nuclear fuel assemblies 217 between the central core region 214 and the peripheral core region 216. This is performed at various stages of core life as required or desired to initiate, maintain, accelerate, or terminate nuclear reactions or power generation and/or for safety reasons. The in-vessel handling system 200 permits movement of the fissile nuclear fuel assemblies 215 and/or fertile nuclear fuel assemblies 217 without removing those assemblies from the nuclear reactor 100.

Lower ends of the pick-up arm assembly 210 and the pull arm 212 include suitable gripping devices, such as grapples or the like, that enable gripping of selected fissile nuclear fuel assemblies 215 and/or fertile nuclear fuel assemblies 217 during movement operations. Rotation of the rotating plugs 204, 206, and 208, and the pivoting arm 224, allows the pick-up arm assembly 210 and the pull arm 212 to be localized to any desired position for pulling a selected fuel assembly out of the core 214 at any desired location, including a location in the peripheral core region 216. The selected fuel assembly may then be moved to a different location within the core 214, peripheral core region 216, or fuel transfer port 220.

FIGS. 3A-3H are top plan views of the in-vessel handling system 200 and central core region 214, with the inner rotating plug 206 omitted for clarity. Each of FIGS. 3A-3H is discussed concurrently below, unless otherwise noted. For ease of discussion only the position of the components in FIGS. 3A-3H will be discussed using cardinal directions (North, South, East, West). For clarity, FIGS. 3A-3H omit many fuel assemblies that would be positioned within the central core region 214. Similarly, many in-vessel storage pots 218 are omitted, again for clarity.

FIGS. 3A-3H depict various ranges of motions, and various relative positions, of the components shown in FIG. 2. Internal structures disposed between the plugs 204, 206 and core assembly 202, not shown in FIG. 2, may prevent or limit all ranges of motion depicted in FIGS. 3A-3H. These internal structures may require different positioning of one or both plugs 204, 206 to access the locations in core assembly 202 as shown.

Figure 3A:
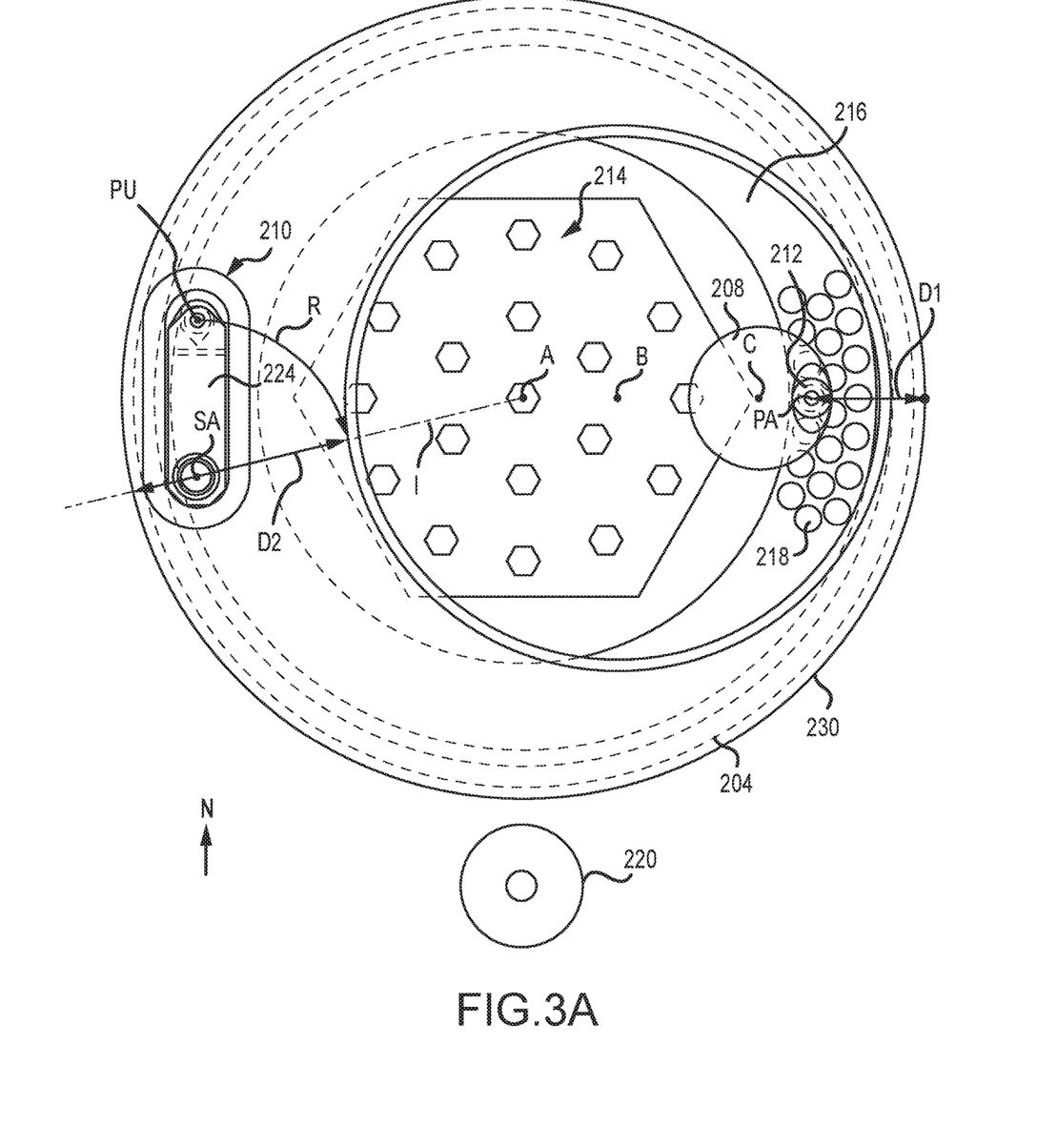
FIGS. 3A-3H are top plan views of components of the in-vessel rod handling system shown in FIG. 2 in various relative positions.
Figure 3B:
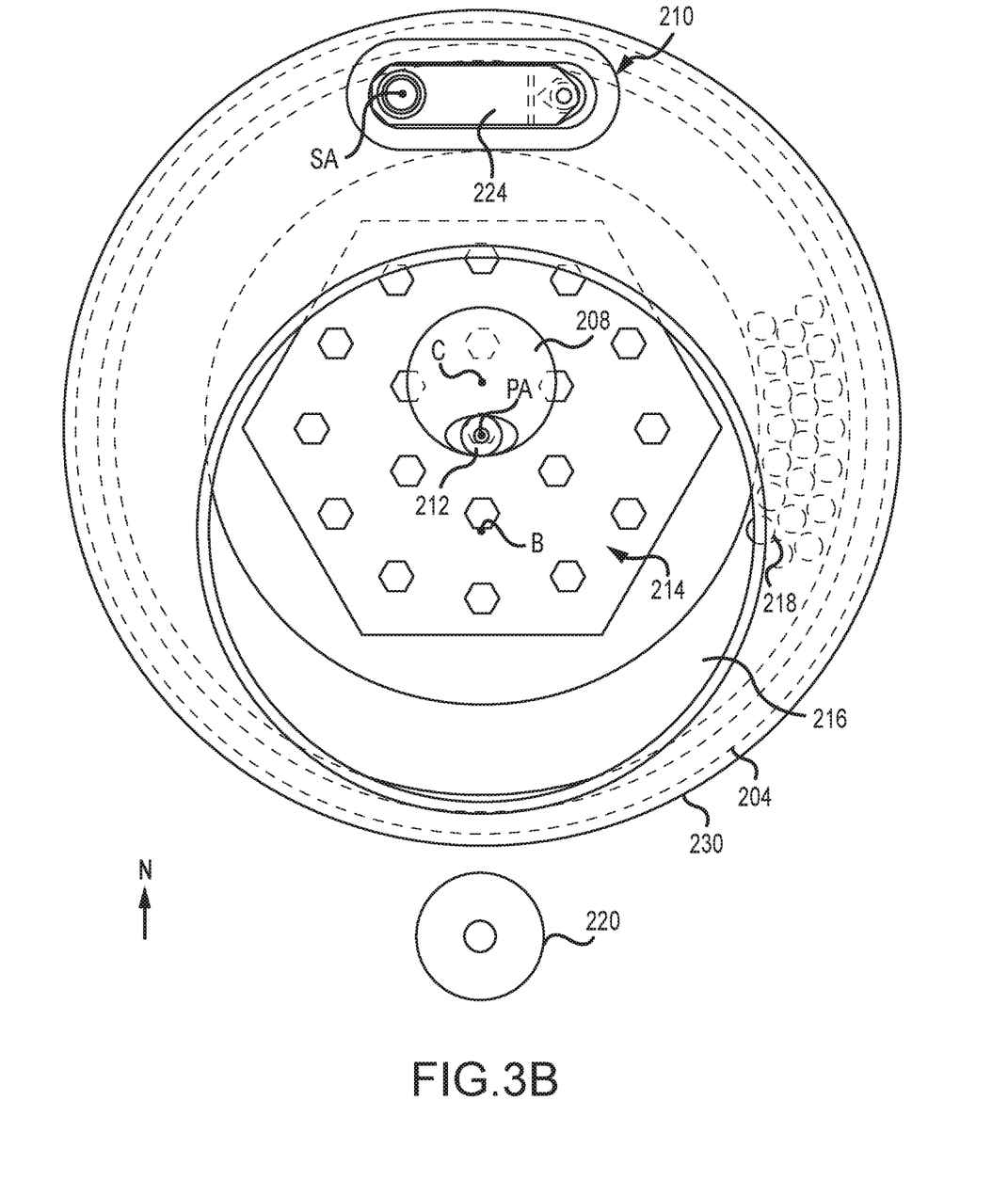

The peripheral core region 216 includes three concentric rings of in-vessel storage pots 218. FIGS. 3A-3B show the pull arm 212 at its outer-most reach, which coincides with the innermost ring of storage pots 218. In other instances, the pull arm 212 is configured to be able to reach every ring of storage pots 218, including the outermost ring. To achieve this orientation, the inner rotating plug 206 and access port rotating plug 208 are rotated such that the position of the pull arm 212 in the East direction is maximized. To enable the pull arm 212 to reach other in-vessel storage pots 218 within the inner most ring, the outer rotating plug 204 rotates with the inner rotating plug 206 and access port rotating plug 208 remaining relatively stationary. By the cooperative rotation of the outer rotating plug 204, the inner rotating plug 206, and the access port rotating plug 208, the pull arm 212 radius of pivoting includes the entirety of the central core 214.

In FIGS. 3A-3B, the pull arm 212 is positioned a distance D1 from an outer circumference 230 of the outer rotating plug 204. The orientation shown in FIG. 3A is the minimum value of D1. As the inner rotating plug 206 and/or the access port rotating plug 208 rotate in either direction, D1 changes. D1 reaches a maximum when the pull arm 212 is positioned as depicted in FIG. 3C.

As shown in FIG. 3A, the pick-up arm assembly 224 may pivot along pivot radius R such that the pick-up axis PU is over the outer portion of the core 214. In this configuration, the pick-up axis PU is between the shaft axis SA and the outer rotating plug 204 axis A along line 1. Additionally, the pick-up axis PU is disposed a distance D2 from the outer circumference 230 of the outer rotating plug 204. Distance D2 is equal to or greater than distance D1, when distance D1 is at a minimum.

FIG. 3B shows an orientation where, from the orientation in FIG. 3A, the outer rotating plug 204 has rotated 90 degrees clockwise, the inner rotating plug 206 has rotated 180 degrees, and the access port rotating plug 208 has rotated 180 degrees. FIG. 3B shows the pull arm 212 oriented such that it may reach the center of the core 214. Put another way, the access port rotating plug 208 and the inner rotating plug 206 have rotated such that the pull arm axis 212 PA aligns with the outer rotating plug 204 axis A. Any rotation of the outer rotating plug 204 from the position shown in FIG. 3B would not change the position of the pull arm 212 axis PA.

Figure 3C:
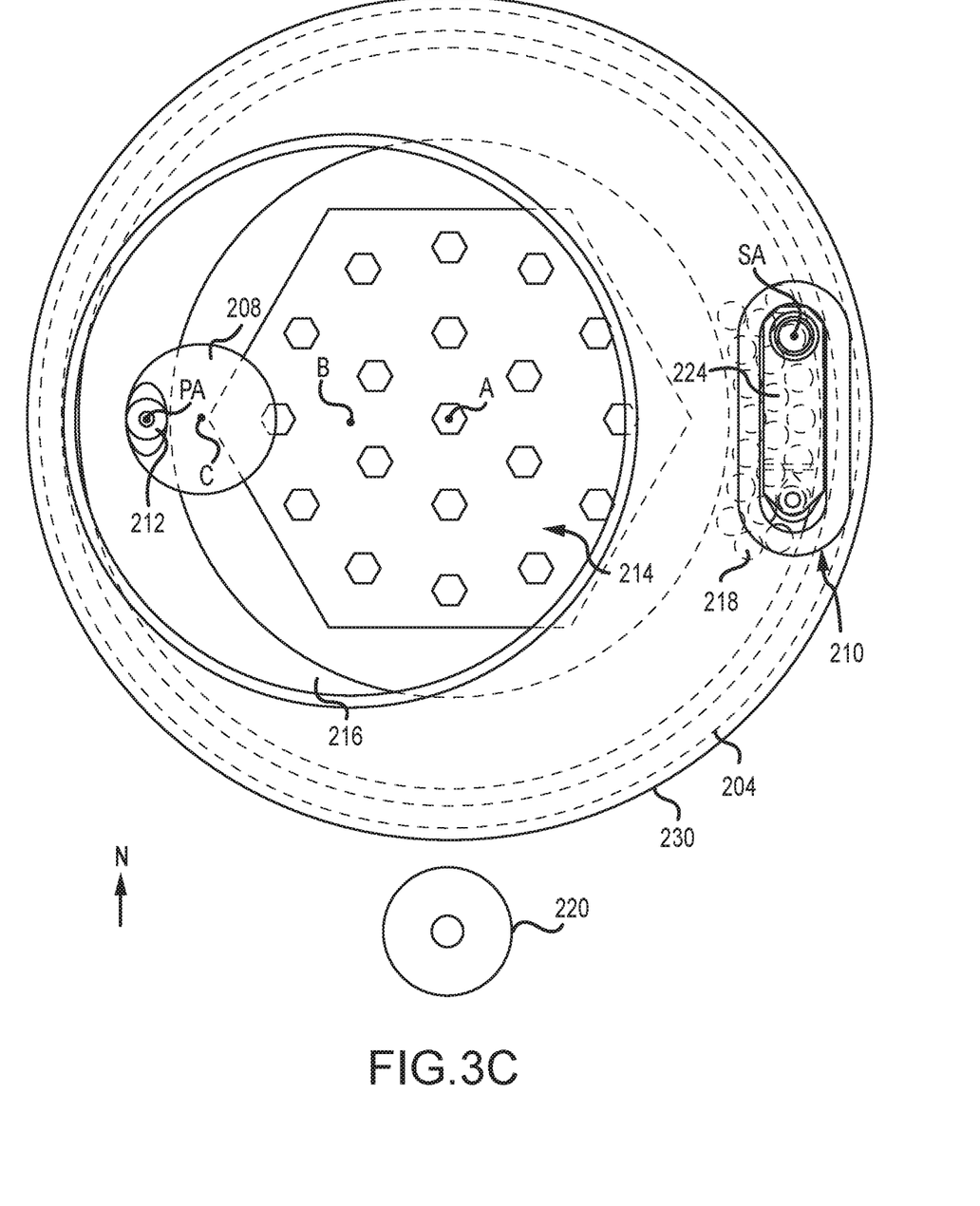

FIG. 3C shows the pull arm 212 oriented such that it may reach an inner row of storage pots 218. To achieve the orientation shown in FIG. 3C, the outer rotating plug 204 has rotated 180 degrees from its position in FIG. 3A.

Figure 3D:
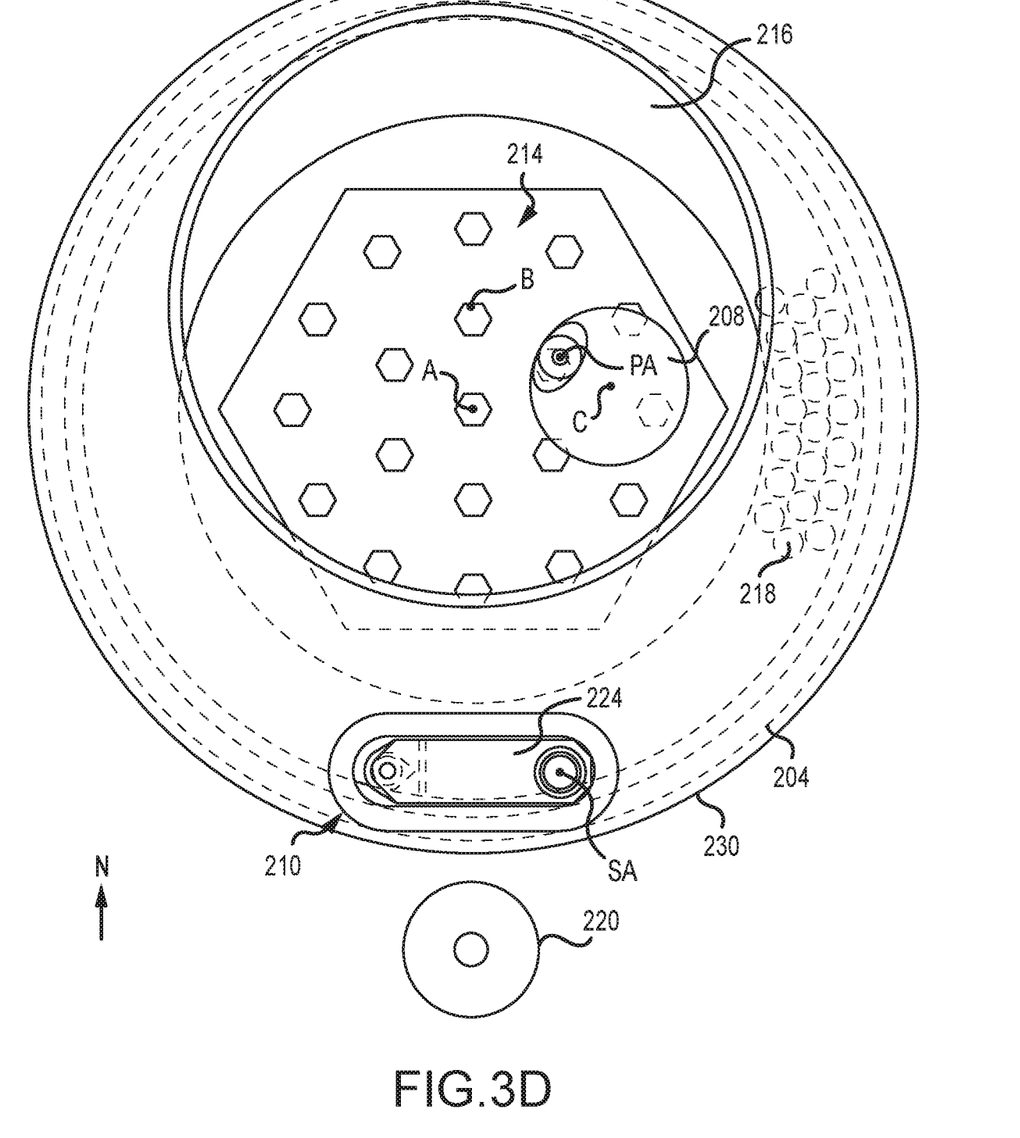

FIG. 3D shows the pull arm 212 positioned at a random location over the core 214. Relative to the orientation shown in FIG. 3C, outer rotating plug 204 has rotated 90 degrees clockwise and both inner rotating plug 206 and access port rotating plug 208 have rotated. This figure helps illustrate that via rotation of the outer rotating plug 204, the inner rotating plug 206, and the access port rotating plug 208, the pull arm 212 can be positioned at virtually any location over the core 214 and the inner ring of the peripheral core region 216.

Figure 3E:
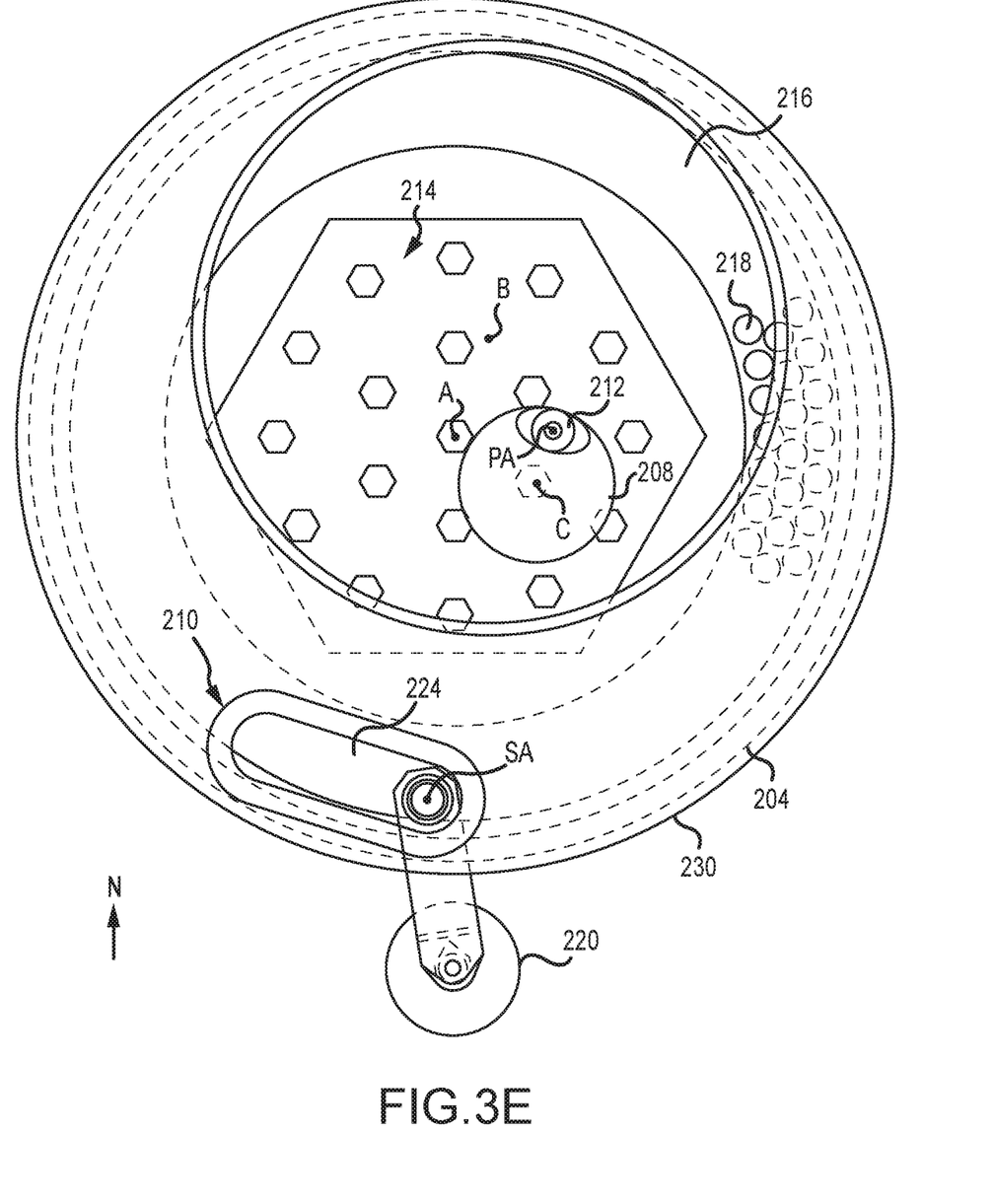

FIG. 3E shows the outer rotating plug 204 rotated such that the pick-up arm assembly 210 can reach the fuel transfer port 220. As shown, the pivoting arm 224 has pivoted to be positioned over the fuel transfer port 220. In the position shown in FIG. 3E, a core fuel assembly rod may be accessible to the pull arm 212. After the outer rotating plug 204 has rotated into the position shown in FIG. 3E, the pivoting arm 224 pivots until a grapple portion is positioned over the fuel transfer port 220.

Figure 3F:
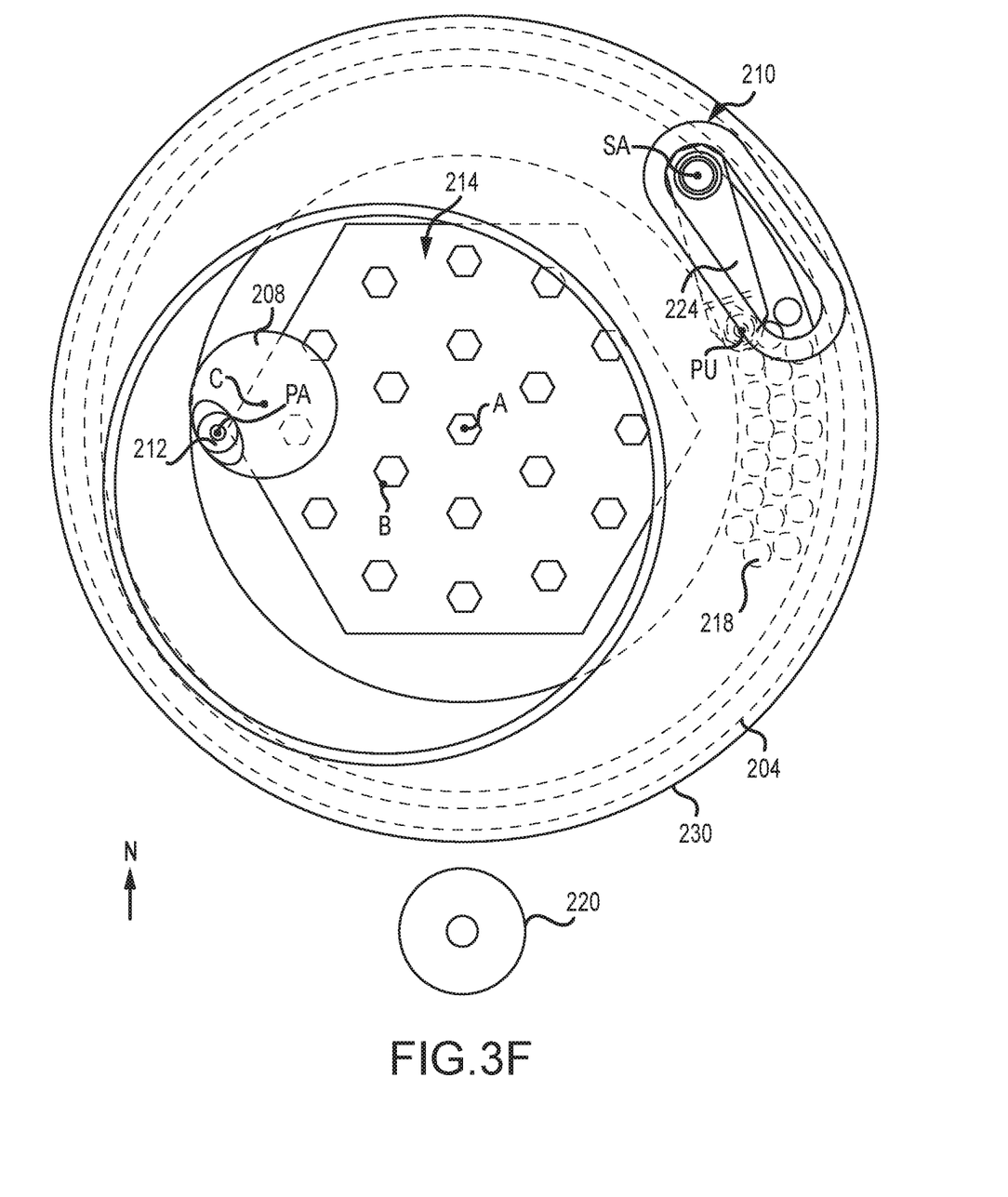
Figure 3G:
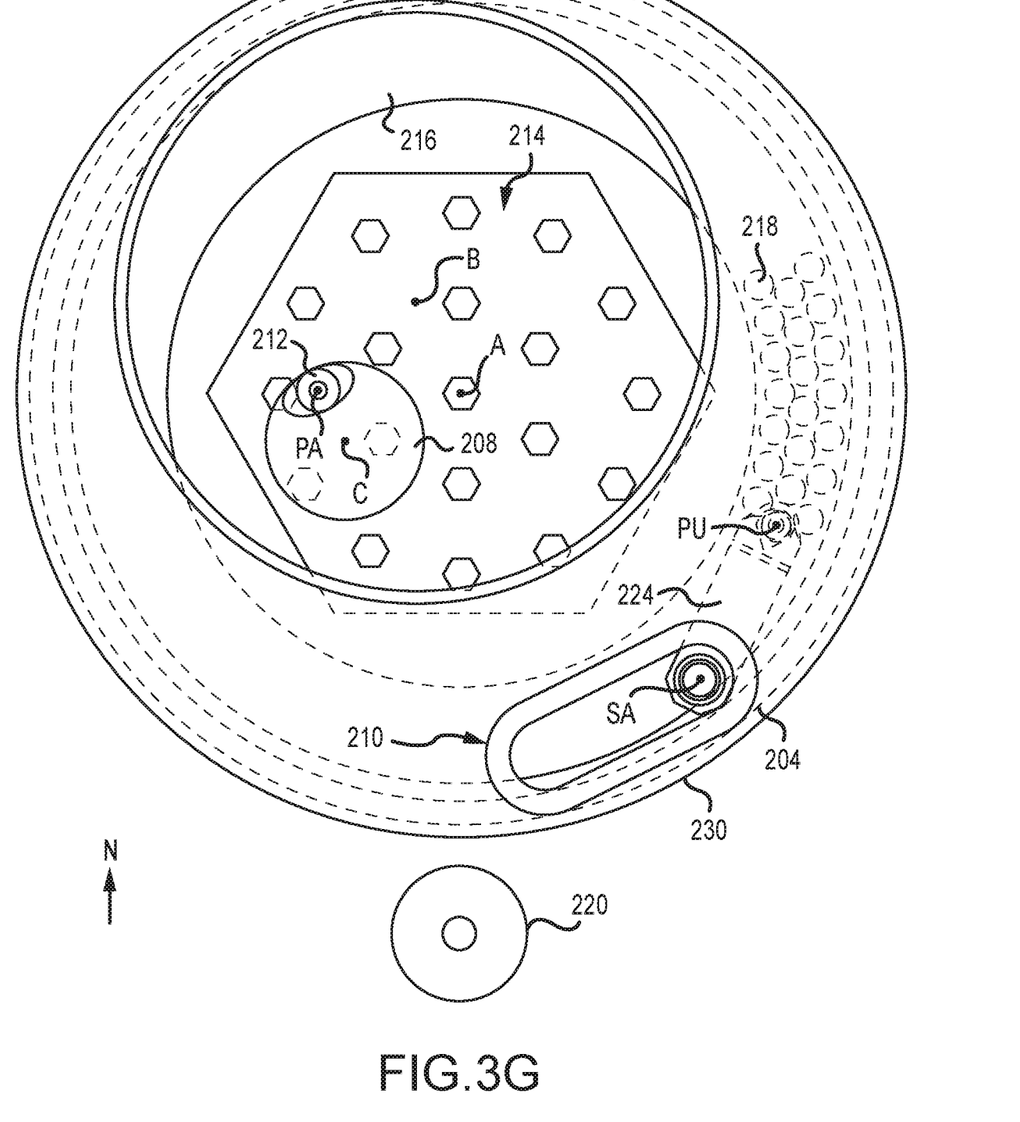

FIGS. 3F-3G show the outer rotating plug 204, the inner rotating plug 206, and the access port rotating plug 208 in random orientations, and the pick-up arm assembly 210 in position above an in-vessel storage pot 218. Generally, the pivoting arm 224 of the pick-up arm assembly 210 can be positioned over each concentric row of the in-vessel storage pots 218. As shown in FIG. 3F, the pivoting arm 224 is interacting with the inner-most ring of the in-vessel storage pot 218 array. In FIG. 3G, the pivoting arm 224 is interacting with the middle ring of the in-vessel storage pot 218 array. The positioning of the inner rotating plug 206 and the access port plug 208 do not affect the in-vessel storage pot 218 interactions.

Figure 3H:
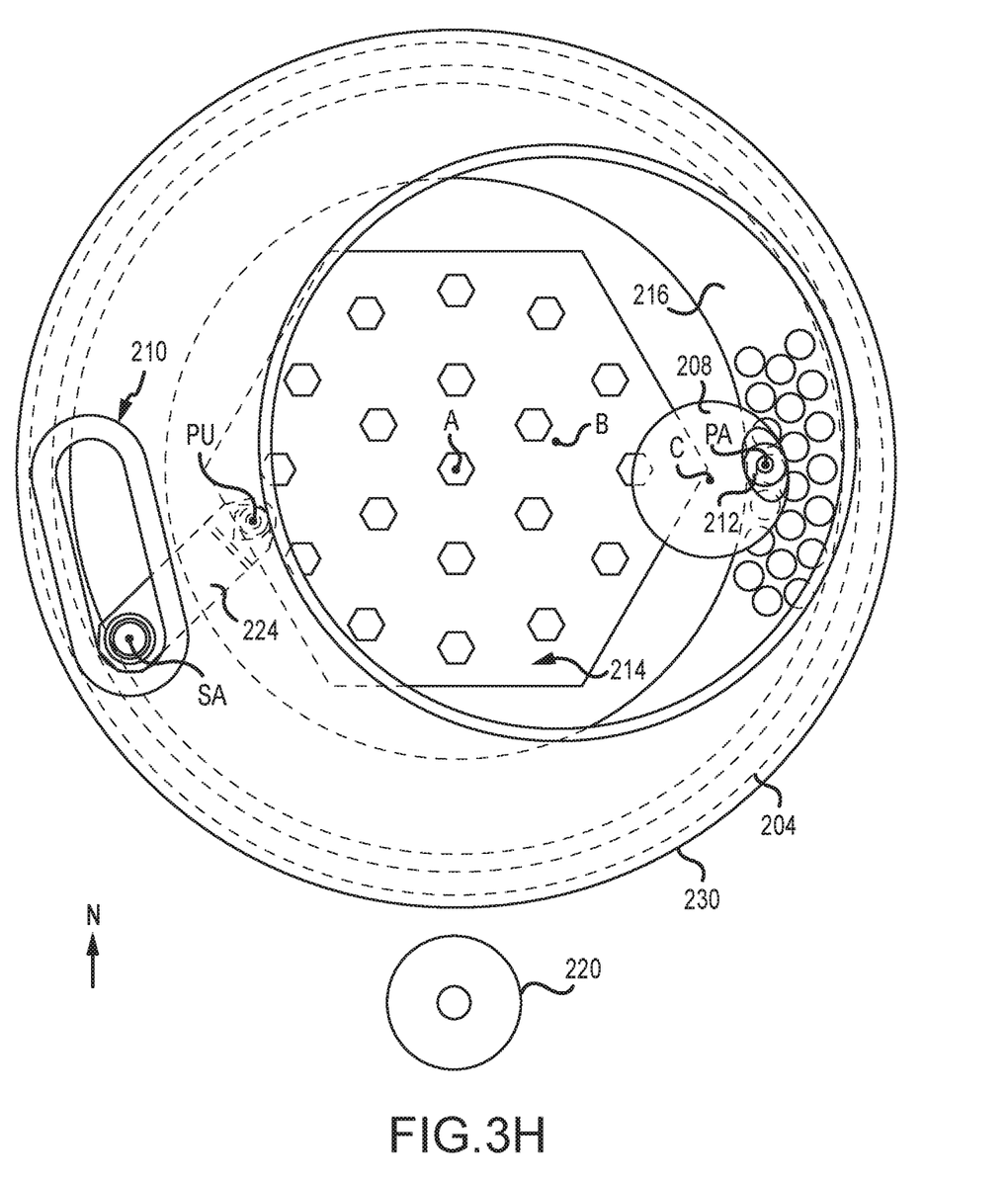

FIG. 3H shows the pick-up arm assembly 210 in position above a location in the core 214. Generally, the pivoting arm 224 can be positioned over the outermost positions within the core 214. As shown in FIG. 3H, the pivoting arm 224 is positioned over the outer ring of the core 214.

It is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. It must be noted that, as used in this specification, the singular forms "a," "an," and "the" include plural referents unless the context clearly dictates otherwise.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

We claim:

1. A rod transfer assembly, comprising:
   an outer rotating plug comprising an outer rotating plug axis;
   a pick-up arm assembly extending from the outer rotating plug and comprising a shaft having a shaft axis parallel to the outer rotating plug axis and a pivoting arm pivotable about the shaft axis and comprising a pick-up mechanism having a pick-up axis disposed proximate an end opposite the shaft of the pick-up arm, wherein the shaft axis is positioned a first radial distance from the outer rotating plug axis;
   an inner rotating plug disposed off-center from and within the outer rotating plug, the inner rotating plug comprising an inner rotating plug axis, wherein the inner rotating plug is rotatable independent of a rotation of the outer rotating plug;
   an access port rotating plug disposed off-center from and within the inner rotating plug, wherein the access port rotating plug is rotatable independent of a rotation of the outer rotating plug and the inner rotating plug; and
   a pull arm extending from the access port rotating plug and comprising a pull arm axis.

2. The rod transfer assembly of claim 1, wherein each of the outer rotating plug axis, the shaft axis, the inner rotating plug axis, and the pull arm axis are parallel to each other.

3. The rod transfer assembly of claim 2, wherein rotation of the access port rotating plug and rotation of the inner rotating plug aligns the pull arm axis with the outer rotating plug axis.

4. The rod transfer assembly of claim 1, wherein the outer rotating plug, the inner rotating plug, and the access port rotating plug are positionable so as to position the pull arm at a first distance from an outer circumference of the large rotating plug.

5. The rod transfer assembly of claim 4, wherein upon pivoting of the pivoting arm, the pick-up axis is positionable between the shaft axis and the outer rotating plug axis;
   wherein when so positioned, the pick-up axis is disposed a second distance from an outer circumference of the outer rotating plug; and
   wherein the second distance is at least one of greater than or equal to the first distance.

6. The rod transfer assembly of claim 1, wherein each of the outer rotating plug, the inner rotating plug, the access port rotating plug, and the pivoting arm comprise a range of rotation at least 90 degrees.

7. The rod transfer assembly of claim 6, wherein the range of rotation is at least 180 degrees.

8. The rod transfer assembly of claim 7, wherein the range of rotation is substantially equal to 360 degrees.

9. The rod transfer assembly of claim 1, wherein the pull arm extends above and below an upper surface of the inner rotating plug.

10. The rod transfer assembly of claim 1, wherein a radius of pivoting for the pivoting arm is less than a reference diameter of the inner rotating plug.

11. The rod transfer assembly of claim 10, wherein the radius of pivoting for the pivoting arm includes an entirety of an in-vessel storage and a portion of a reactor core center.

12. The rod transfer assembly of claim 11, wherein a radius of pivoting for the pull arm includes an entirety of a reactor core center.

13. The rod transfer assembly of claim 12, wherein the radius of pivoting for the pull arm includes an inner ring of an in-vessel storage.

14. A rod transfer assembly, comprising:
- an outer rotating plug comprising an outer rotating plug axis;
- a pick-up arm assembly extending from the outer rotating plug and comprising a shaft having a shaft axis parallel to the outer rotating plug axis and a pivoting arm pivotable about the shaft axis, wherein the shaft axis is positioned a first radial distance from the outer rotating plug axis;
- an inner rotating plug disposed off-center from and within the outer rotating plug, the inner rotating plug comprising an inner rotating plug axis, wherein the inner rotating plug is rotatable independent of a rotation of the outer rotating plug, and wherein a radius of pivoting for the pivoting arm is less than a reference diameter of the inner rotating plug;
- an access port rotating plug disposed off-center from and within the inner rotating plug, wherein the access port rotating plug is rotatable independent of a rotation of the outer rotating plug and the inner rotating plug; and
- a pull arm extending from the access port rotating plug and comprising a pull arm axis.

15. The rod transfer assembly of claim 14, wherein the radius of pivoting for the pivoting arm includes an entirety of an in-vessel storage and a portion of a reactor core center.

16. The rod transfer assembly of claim 15, wherein a radius of pivoting for the pull arm includes an entirety of a reactor core center.

17. The rod transfer assembly of claim 16, wherein the radius of pivoting for the pull arm includes an inner ring of an in-vessel storage.

18. The rod transfer assembly of claim 14, wherein each of the outer rotating plug, the inner rotating plug, the access port rotating plug, and the pivoting arm comprise a range of rotation at least 90 degrees.

19. The rod transfer assembly of claim 18, wherein the range of rotation is at least 180 degrees.

20. The rod transfer assembly of claim 19, wherein the range of rotation is substantially equal to 360 degrees.

* * * * *